(12) United States Patent
Benson et al.

(10) Patent No.: US 11,136,245 B2
(45) Date of Patent: Oct. 5, 2021

(54) SALT WALL IN A MOLTEN SALT REACTOR

(71) Applicant: Alpha Tech Research Corp., Salt Lake City, UT (US)

(72) Inventors: John Benson, Pleasant Grove, UT (US); Matthew Memmott, Provo, UT (US)

(73) Assignee: Alpha Tech Research Corp, Bountiful, UT (US)

( * ) Notice: Subject to any disclaimer, the term of this patent is extended or adjusted under 35 U.S.C. 154(b) by 0 days.

(21) Appl. No.: 16/709,449

(22) Filed: Dec. 10, 2019

(65) Prior Publication Data
US 2020/0185115 A1  Jun. 11, 2020

Related U.S. Application Data

(60) Provisional application No. 62/927,094, filed on Oct. 28, 2019, provisional application No. 62/777,595,
(Continued)

(51) Int. Cl.
*G21C 3/54* (2006.01)
*C01G 43/06* (2006.01)
(Continued)

(52) U.S. Cl.
CPC ............... *C01G 43/06* (2013.01); *C01D 3/02* (2013.01); *C01D 3/04* (2013.01); *C01D 15/04* (2013.01);
(Continued)

(58) Field of Classification Search
CPC ............. G21C 3/54; G21C 19/28; G21C 1/02
See application file for complete search history.

(56) References Cited

U.S. PATENT DOCUMENTS 2,853,446 A    9/1958  Abbott et al.
2,920,024 A    1/1960  Barton et al.
(Continued)

FOREIGN PATENT DOCUMENTS

JP    2006213972 A    8/2006

OTHER PUBLICATIONS

Carter et al., "Fuel and Blanket Processing Development for Molten Salt Breeder Reactors", Oak Ridge National Labratory, Jun. 1967, as issued in connection with International Patent Application No. PCT/US2019/065488, dated May 3, 2020, 55 pages.
Jones et al., "Phase Equilibria in the Ternary Fused-Salt System", Mound Labratory, as issued in connection with International Patent Application No. PCT/US2019/065488, dated May 3, 2020, 3 pages.
Carter, et al. Fuel and Blanket Processing Development for Molten Salt Breeder Reactors. No. ORNL-TM-1852. Jun. 1967. Oak Ridge National Lab., Tenn., Entire Document.
(Continued)

*Primary Examiner* — Lily C Garner
(74) *Attorney, Agent, or Firm* — Sanders IP Law

(57) ABSTRACT

Some embodiments include a method comprising: flowing a molten salt out of a molten salt reactor at a first temperature, heating the molten salt reactor to a second temperature above the melding point of the second salt mixture causing the second salt mixture to melt; flowing the second salt mixture out of the molten salt reactor; flowing a third salt mixture into the molten salt reactor; and cooling the molten salt reactor from the second temperature to a third temperature causing the third salt mixture to solidify on the interior surface of the housing. In some embodiments, the molten salt may include a first salt mixture comprising at least uranium. In some embodiments, the first temperature is a temperature above the melting point of the first salt mixture.

20 Claims, 4 Drawing Sheets

Related U.S. Application Data filed on Dec. 10, 2018, provisional application No. 62/777,603, filed on Dec. 10, 2018, provisional application No. 62/777,612, filed on Dec. 10, 2018, provisional application No. 62/927,098, filed on Oct. 28, 2019.

(51) Int. Cl.
| | |
|---|---|
| *C01D 3/02* | (2006.01) |
| *C01D 15/04* | (2006.01) |
| *C01F 5/30* | (2006.01) |
| *C01F 11/22* | (2006.01) |
| *C01D 3/04* | (2006.01) |
| *G21C 5/18* | (2006.01) |
| *G21C 19/28* | (2006.01) |
| *G21C 1/02* | (2006.01) |

(52) U.S. Cl.
CPC ............... *C01F 5/30* (2013.01); *C01F 11/22* (2013.01); *G21C 3/54* (2013.01); *G21C 5/18* (2013.01); *G21C 19/28* (2013.01); *G21C 1/02* (2013.01)

(56) References Cited

U.S. PATENT DOCUMENTS

| | | | |
|---|---|---|---|
| 3,473,897 | A | 10/1969 | Shaffer et al. |
| 4,186,049 | A * | 1/1980 | Blum ............... G21C 1/22 376/305 |
| 6,471,922 | B1 | 10/2002 | Hsu et al. |
| 8,734,738 | B1 | 5/2014 | Herrmann |
| 2004/0045835 | A1 | 3/2004 | Dees et al. |
| 2015/0036779 | A1* | 2/2015 | Leblanc ............... G21C 1/322 376/207 |
| 2015/0078504 | A1 | 3/2015 | Woolley |
| 2016/0189806 | A1 | 6/2016 | Cheatham, III et al. |
| 2017/0271033 | A1 | 9/2017 | Dodson et al. |
| 2017/0294241 | A1 | 10/2017 | Dodson et al. |
| 2019/0316727 | A1* | 10/2019 | Giudice ............... F17C 13/02 |
| 2019/0371482 | A1 | 12/2019 | Benson et al. |

OTHER PUBLICATIONS

Jones, et al. "Phase Equilibria in the Ternary Fused-Salt System LiF-BeF2, -UF4" Journal of the American Ceramic Society 45.2 Feb. 1962 79-83. Entire Document.

Krepel, et al. "Molten salt reactor with simplified fuel recycling and delayed carrier salt cleaning." 2014 22nd International Conference on Nuclear Engineering. American Society of Mechanical Engineers Digital Collection, Nov. 17, 2014. Entire Document.

International Search Report and Written Opinion as issued in connection with International Patent Application No. PCT US2019/065488, dated Jun. 3, 2020, 14 pages.

International Search Report and Written Opinion as issued in connection with International Patent Application No. PCT/US19/65483, dated Mar. 25, 2020, 12 pages.

Capelli et al. "Thermodynamic assessment of the LiF-NaF-BeF2-ThF4-UF4 system" Journal of Nuclear Materials, vol. 449 Issues 1-3 (Mar. 12, 2014): pp. 111-121; entire document, but especially: abstract, p. 121 col. 1 para 2, table 8.

Barton et al. "Phase Equilibria in the Alkali Fluoride-Uranium Tetrafluoride Fused Salt Systems: I, The systems LiF-UF4 and NaF-UF4" Journal of the American Ceramic Society, vol. 41 Issue 2 (Feb. 1958): pp. 63-69; entire document.

Thoma et al. "Phase Equilibria in the Alkali Fluoride-Uranium Tetrafluoride Fused Salt Systems: III, The System NaF-Lif-UF4" Journal of the American Ceramic Society, vol. 42 Issue 1 (Jan. 1959): pp. 21-26; entire document.

Thoma et al. "Phase Equilibria in the Alkali Fluoride-Uranium Tetrafluoride Fused Salt Systems: II, The Systems KF-UF4 and RbF-UF4" Journal of the American Ceramic Society, vol. 41 Issue 12 (Dec. 1958): pp. 538-544; entire document.

Eichelberger et al. "Phase Equilibria for the Ternary Fused-Salt System NaF-BeF2-UF4" Journal of the American Ceramic Society. vol. 46 Issue 6 (Jun. 1963): pp. 279-283; entire document.

International Search Report and Written Opinion dated Nov. 19, 2019 in related PCT Application No. PCT/US2019/0342779 ( 8 Pages).

\* cited by examiner

SALT WALL IN A MOLTEN SALT REACTOR

BACKGROUND

Molten salt reactors are a class of nuclear fission reactors in which the primary nuclear reactor coolant and/or the fuel is a molten salt mixture. Molten salt reactors offer multiple advantages over conventional nuclear power plants.

SUMMARY

Some embodiments include a molten salt reactor. The molten salt reactor may include a molten salt chamber having a housing with a salt wall coating the interior surface of the housing. In some embodiments, the salt wall includes a first salt mixture having a first melting point and selected from the group consisting of sodium fluoride, potassium fluoride, aluminum fluoride, zirconium fluoride, lithium fluoride, beryllium fluoride, rubidium fluoride, magnesium fluoride, and calcium fluoride. A molten salt may be disposed within the molten salt chamber. The molten salt may include a second salt mixture including at least uranium and the first salt mixture with different molar ratios. In some embodiments, the molten salt may include a second melting point which is more than 50° C. greater than the first melting point.

In some embodiments, the salt wall comprises a salt having a melting point greater than 750° C. and the molten salt comprises a salt having a melting point less than about 650° C. In some embodiments, the salt wall has a thickness less than about 3 inches.

Some embodiments include a molten salt reactor. The molten salt reactor may include a molten salt chamber having a housing with a salt wall coating the interior surface of the housing. The salt wall may include a salt having a first melting point which is greater than about 650° C. A molten salt may be disposed within the molten salt chamber. The molten salt may include at least uranium fluoride, and the molten salt may have a second melting point which is less than about 650° C.

In some embodiments, the salt wall has a thickness less than about 3 inches.

In some embodiments, the first a melting point greater than 850° C. and the molten salt comprises a salt having a melting point less than about 750° C. In some embodiments, the first melting point is greater than about 750° C. In some embodiments, the second melting point is less than about 550° C.

In some embodiments, the salt wall comprises a salt having the same constituents as the molten salt with different molar ratios. In some embodiments, the molten salt comprises a salt selected from the group consisting of sodium fluoride, potassium fluoride, aluminum fluoride, zirconium fluoride, lithium fluoride, beryllium fluoride, rubidium fluoride, magnesium fluoride, and calcium fluoride. In some embodiments, the salt wall comprises additional elements and/or impurities that can be detected in the molten salt as an indicator that the salt wall is deteriorating, thinning, and/or melting.

Some embodiments include a molten salt reactor. The molten salt reactor may include a molten salt chamber having a housing with a salt wall coating the interior surface of the housing. The salt wall may include a salt selected from the group consisting of sodium fluoride, potassium fluoride, aluminum fluoride, zirconium fluoride, lithium fluoride, beryllium fluoride, rubidium fluoride, magnesium fluoride, and calcium fluoride. A molten salt may be disposed within the molten salt chamber. The molten salt may include a salt mixture comprising at least uranium.

In some embodiments, salt wall has a thickness less than about 3 inches.

In some embodiments, the salt wall comprises a salt having the same constituents as the molten salt with different molar ratios. In some embodiments, the salt wall comprises additional elements and/or impurities that can be detected in the molten salt as an indicator that the salt wall is deteriorating, thinning, and/or melting.

In some embodiments, the salt wall comprises a salt having a melting point greater than 850° C. and the molten salt comprises a salt having a melting point less than about 750° C. In some embodiments, the salt wall comprises a salt having a melting point greater than 750° C. and the molten salt comprises a salt having a melting point less than about 650° C. In some embodiments, the salt wall comprises a salt having a melting point greater than 650° C. and the molten salt comprises a salt having a melting point less than about 550° C. In some embodiments, the salt wall comprises a salt having a first melting point and the molten salt comprises a salt having a second melting point, wherein the second melting point is 100° C. less than the first melting point. In some embodiments, the salt wall comprises a salt having a first melting point and the molten salt comprises a salt having a second melting point, wherein the second melting point is 50° C. less than the first melting point.

Some embodiments include a molten salt reactor comprising: a molten salt chamber having: a housing comprising an interior surface and a salt wall coating the interior surface of the housing; and a molten salt disposed within the molten salt chamber, the molten salt comprising a salt mixture comprising at least uranium fluoride.

In some embodiments, the salt wall has a thickness less than about one inch. In some embodiments, the salt wall has a thickness less than about one centimeter. In some embodiments, the salt wall has a thickness less than about one millimeter.

In some embodiments, the salt wall comprises a salt having the same constituents of the molten salt with different molar ratios.

In some embodiments, the salt wall comprises a salt having a melting point greater than 850° C. and the molten salt comprises a salt having a melting point less than about 750° C. In some embodiments, the salt wall comprises a salt having a melting point greater than 750° C. and the molten salt comprises a salt having a melting point less than about 650° C. In some embodiments, the salt wall comprises a salt having a melting point greater than 650° C. and the molten salt comprises a salt having a melting point less than about 550° C.

In some embodiments, the salt wall comprises a salt having a first melting point and the molten salt comprises a salt having a second melting point, wherein the second melting point is 100° C. less than the first melting point.

In some embodiments, the salt wall comprises a salt having a first melting point and the molten salt comprises a salt having a second melting point, wherein the second melting point is 50° C. less than the first melting point.

In some embodiments, the molten salt comprises salts selected from the group consisting of sodium fluoride, potassium fluoride, aluminum fluoride, zirconium fluoride, lithium fluoride, beryllium fluoride, rubidium fluoride, magnesium fluoride, and calcium fluoride.

Some embodiments include a method comprising: flowing a molten salt out of a molten salt reactor at a first temperature, heating the molten salt reactor to a second temperature above the melding point of the second salt mixture causing the second salt mixture to melt; flowing the second salt mixture out of the molten salt reactor; flowing a third salt mixture into the molten salt reactor; and cooling the molten salt reactor from the second temperature to a third temperature causing the third salt mixture to solidify on the interior surface of the housing. In some embodiments, the molten salt may include a first salt mixture comprising at least uranium. In some embodiments, the first temperature is a temperature above the melting point of the first salt mixture. In some embodiments, the molten salt reactor may include a housing with a salt wall coating an interior surface of the housing. In some embodiments, the salt wall includes a second salt mixture, and the second salt mixture being solid at the first temperature.

In some embodiments, the third salt mixture may include the same salts as the second salt mixture but has been adjusted to the correct eutectic ratio and/or decontaminated of impurities In some embodiments, the method further may include cleaning the interior surface of the housing prior to flowing the third salt mixture into the molten salt reactor.

In some embodiments, the first salt mixture may include at least one salt selected from the list consisting of uranium fluoride, magnesium fluoride, potassium fluoride, sodium chloride, magnesium chloride, and potassium chloride.

In some embodiments, further comprising flowing a molten salt into the molten salt reactor after cooling the molten salt reactor from the second temperature to the first temperature causing the third salt mixture to solidify on the interior surface of the housing.

In some embodiments, the second salt mixture and the third salt mixture are substantially the same salt mixture.

In some embodiments, the second temperature may be 50° C. greater than the first temperature.

In some embodiments, the cooling the molten salt reactor from the second temperature to the first temperature causing the third salt mixture to solidify on the interior surface of the housing continues until the third salt mixture has solidified to a thickness of about 1 centimeter on the interior surface of the housing.

In some embodiments, the first salt mixture may include salts selected from the group consisting of sodium fluoride, potassium fluoride, aluminum fluoride, zirconium fluoride, lithium fluoride, beryllium fluoride, rubidium fluoride, magnesium fluoride, and calcium fluoride.

In some embodiments, the first salt mixture may include one or more of fission products, uranium, plutonium, portions of the second salt mixture, etc.

In some embodiments, the second salt mixture may include salts selected from the group consisting of sodium fluoride, potassium fluoride, aluminum fluoride, zirconium fluoride, lithium fluoride, beryllium fluoride, rubidium fluoride, magnesium fluoride, and calcium fluoride.

In some embodiments, the third salt mixture may include salts selected from the group consisting of sodium fluoride, potassium fluoride, aluminum fluoride, zirconium fluoride, lithium fluoride, beryllium fluoride, rubidium fluoride, magnesium fluoride, and calcium fluoride.

Some embodiments include a method, which may include flowing a molten salt out of a molten salt reactor at a first temperature, the molten salt may include a mixture including uranium and one or more salts selected from the group consisting of sodium fluoride, potassium fluoride, aluminum fluoride, zirconium fluoride, lithium fluoride, beryllium fluoride, rubidium fluoride, magnesium fluoride, and calcium fluoride; heating the molten salt reactor to a second temperature above the melting point of a second salt mixture disposed as a salt wall on a surface of the molten salt reactor causing the second salt mixture to melt; flowing the second salt mixture out of the molten salt reactor; flowing a third salt mixture into the molten salt reactor; and cooling the molten salt reactor from the second temperature to the third temperature causing the third salt mixture to solidify on the interior surface of the housing.

In some embodiments, the salt wall may include a second salt mixture that is solid at the first temperature.

In some embodiments, the first temperature may be a temperature above the melting point of the first salt mixture.

In some embodiments, the third salt mixture amy not not include uranium.

In some embodiments, the method includes: flowing a molten salt into the molten salt reactor after cooling the molten salt reactor from the second temperature to the first temperature causing the third salt mixture to solidify on the interior surface of the housing.

In some embodiments, one or more of the first salt mixture, the second salt mixture, or the third salt mixture may include one or more salts selected from the group consisting of sodium fluoride, potassium fluoride, aluminum fluoride, zirconium fluoride, lithium fluoride, beryllium fluoride, rubidium fluoride, magnesium fluoride, and calcium fluoride.

In some embodiments, one or more of the first salt mixture, the second salt mixture, or the third salt mixture may include at least one salt selected from the group consisting of sodium chloride, magnesium chloride, and potassium chloride.

In some embodiments, one or more of the first salt mixture, the second salt mixture, or the third salt mixture may include a salt mixture comprising at least one salt selected from the group consisting of sodium fluoride, magnesium fluoride, and potassium fluoride.

Some embodiments include a method, which may include flowing a molten salt out of a molten salt reactor at a first temperature; heating the molten salt reactor to a second temperature above the melting point of a second salt mixture disposed as a salt wall on a surface of the molten salt reactor causing the second salt mixture to melt, the second salt mixture comprises one or more actinides; flowing the second salt mixture out of the molten salt reactor, the second salt mixture comprising uranium; flowing a third salt mixture into the molten salt reactor, the third salt mixture does not include a substantantial amount of actnides; and cooling the molten salt reactor from the second temperature to the third temperature causing the third salt mixture to solidify on the interior surface of the housing.

BRIEF DESCRIPTION OF THE FIGURES

These and other features, aspects, and advantages of the present disclosure are better understood when the following Description is read with reference to the accompanying drawings.

DETAILED DESCRIPTION

Systems and methods are disclosed for using a salt wall within a molten salt reactor or a molten salt chamber. A molten salt reactor may be a nuclear fission reactor in which the primary nuclear reactor coolant, or even the fuel itself, is a molten salt mixture. In some embodiments, molten salt reactors can run at higher temperatures than water-cooled reactors for a higher thermodynamic efficiency, while staying at or near ambient pressure. In some embodiments, the fuel in a molten salt reactor may include a molten mixture of fluoride salts (e.g., lithium fluoride and beryllium fluoride (FLiBe)) with dissolved uranium (U-235 or U-233) fluorides. In some embodiments, the uranium may be U-233, low-enriched uranium (5% or less of the Uranium is U-235), or high enriched uranium (more than 5% of the Uranium is U-235). In some embodiments, the rate of fission in a molten salt reactor can be inherently stable.

Figure 1:
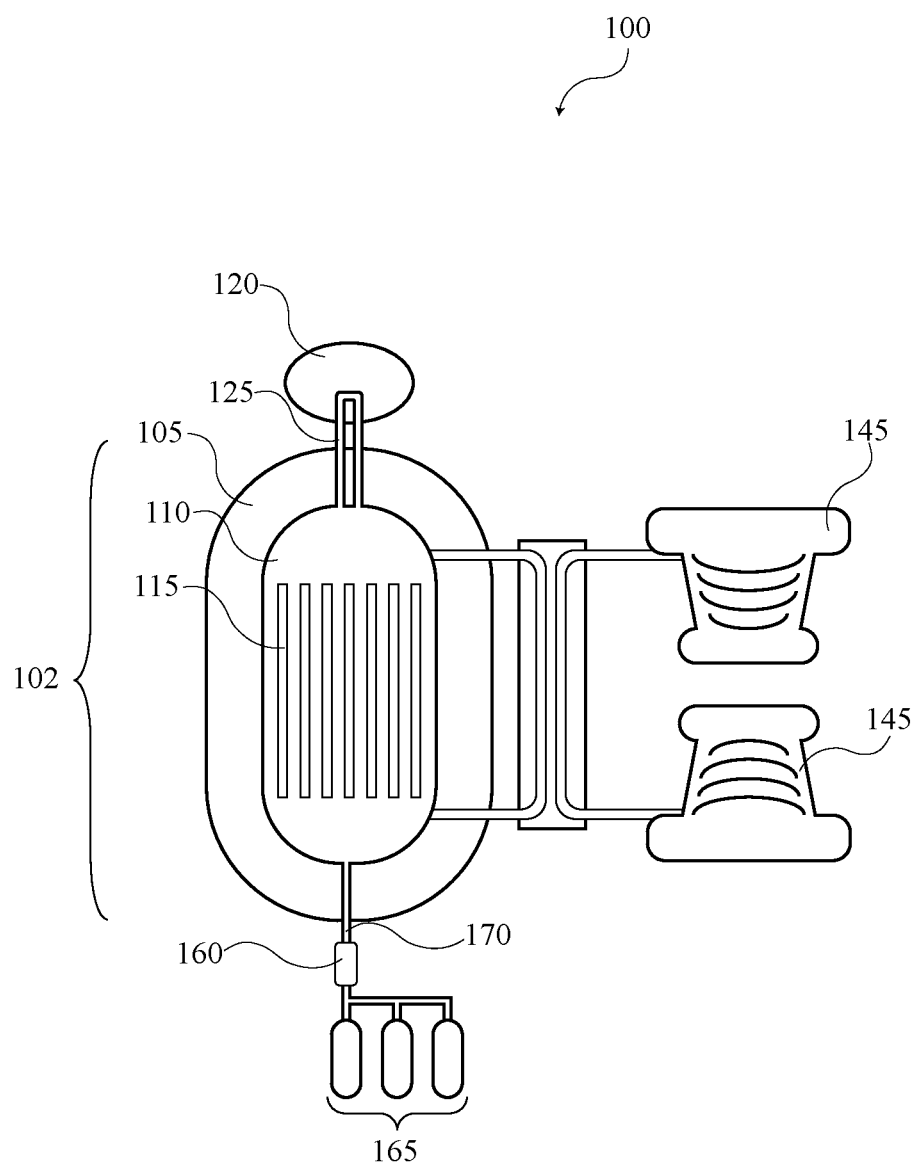
FIG. 1 is a diagram of a molten salt reactor system according to some embodiments.

FIG. 1 is a diagram of a molten salt reactor system 100 according to some embodiments. The molten salt reactor system 100 may include a reactor (e.g., reactor 102), a chemical separation subsystem (e.g., including chemical separation chamber 120), safety systems (e.g., including emergency dump tanks 165), and turbines 145.

The reactor may include any type of molten salt fission device or system whether or not it includes a reactor. The reactor may include a liquid-salt very-high-temperature reactor, a liquid fluoride thorium reactor, a liquid chloride thorium reactor, a liquid salt breeder reactor, a liquid salt solid fuel reactor, a high flux water reactor with a uranium-salt or thorium salt target etc. The molten salt fission reactor, for example, may employ one or more molten salts with a fissile material. The molten salt, for example, may include any salt comprising Fluorine, Chlorine, Lithium, Sodium, Potassium, Beryllium, Zirconium, Rubidium, Magnesium etc., or any combination thereof. Some examples of molten salts may include LiF, LiF—$BeF_2$, 2LiF—$BeF_2$, LiF—$BeF_2$—$ZrF_4$, NaF—$BeF_2$, LiF—NaF—$BeF_2$, LiF—$ZrF_4$, LiF—NaF—$ZrF_4$, KF—$ZrF_4$, RbF—$ZrF_4$, LiF—KF, LiF—RbF, LiF—NaF—KF, LiF—NaF—RbF, $BeF_2$—NaF, NaF—$BeF_2$, LiF—NaF—KF, NaF—$MgF_2$, NaF—$MgF_2$—KF etc. In some embodiments, the molten salt may include sodium fluoride, potassium fluoride, aluminum fluoride, zirconium fluoride, lithium fluoride, beryllium fluoride, rubidium fluoride, magnesium fluoride, and/or calcium fluoride In some embodiments, the molten salt may include any of the following possible salt eutectics. Many other eutectics may be possible. The following examples also include the melting point of the example eutectics. The molar ratios are examples only. Various other eutectics may be used.

LiF—NaF (60-40 mol %) 652° C.
LiF—KF (50-50 mol %) 492° C.
LiF—NaF—KF (46.5-11.5-42 mol %) 454° C.
LiF—NaF—$CaF_2$ (53-36-11 mol %) 616° C.
LiF—NaF—$MgF_2$—$CaF_2$ (~50-~30-~10-~10 mol %)~600° C.
LiF—$MgF_2$—$CaF_2$ (~65-~12-~23 mol %) 650-725° C.
LiF—$BeF_2$ (66.5-33.5 mol %) 454° C.
NaF—$BeF_2$ (69-31 mol %) 570° C.
LiF—NaF—$BeF_2$ (15-58-27) 480° C.
LiF—NaF—$ZrF_4$ (37-52-11) 604° C.
LiF—$ThF_4$ (71-29) 565° C.
NaF—$ThF_4$ (77.5-22.5) 618° C.
NaF—$ThF_4$ (63-37) 690° C.
NaF—$ThF_4$ (59-41) 705° C.
LiF—$UF_4$ (73-27) 490° C.
NaF—$UF_4$ (78.5-21.5) 618° C.
LiF—NaF—$UF_4$ (24.3-43.5-32.2) 445° C.

The reactor 102 may include a reactor blanket 105 that surrounds a reactor core 110. A plurality of rods 115 may be disposed within the reactor core 110. The reactor core 110, for example, may include a Uranium rich molten salt such as, for example, $UF_4$—FLiBe. The reactor blanket 105 may include a breeding actinide salt that can produce Uranium for the reactor core 110. The reactor blanket 105 may include a thorium rich fluoride salt. For example, the reactor blanket 105 may include thorium-232, which through neutron irradiation becomes thorium-233. Thorium-233 has a half-life of 22 minutes and through beta decay becomes protactinium-233. Then, through a second beta decay protactinium-233, which has a half-life of 26.97 days, becomes uranium-233, which is additional fuel for the reactor core 110.

The rods 105 may include any material that may act as a neutron energy moderator such as, for example, graphite, $ZrH_x$, light water, heavy water, beryllium, etc. The neutron energy moderator may be selected or not used at all based on the desire for thermal, epithermal, or fast spectrum neutrons within the reactor core 105.

In some embodiments, the reactor system 100 may include a chemical separation subsystem. The chemical separation subsystem, for example, may include a chemical separation chamber 120 and/or a chemical separation loop 125. The chemical separation subsystem, for example, may be used to extract fission products and purify the base salts. A list of fission products can be found, for example, at www-nds.iaea.org/wimsd/fpyield.htm#T1 and/or at www-nds.iaea.org/wimsd/fpyield.htm#T2. The chemical separation subsystem, for example, may remove fission products without removing actinides (e.g., Uranium 233, 235 and Plutonium 239, etc.) from the reactor core.

The safety subsystem may include an emergency dump conduit 170, a freeze plug 160, and a plurality of emergency dump tanks 165. The emergency dump tanks 165 are connected with the reactor core 110 via the dump conduit 170. The freeze plug 160 may be an active element that keeps the material within the reactor core 110 unless there is an emergency. If the freeze plug 160, for example, loses power or is otherwise triggered, the dump conduit is opened and the all material in the reactor core 110 is dumped into the dump tanks 165. The dump tanks 165 may include materials such as, for example, neutron moderating materials. The dump tanks 165, for example, may be placed in a location where any reactions can be controlled. The dump tanks 165, for example, may be sized to preclude the possibility of a sustained reaction.

Because of the presence of various molten salts, the walls of any of the chambers (e.g., tubes, channels, conduits, receptacles, etc.) in a molten salt reactor may be subjected to corrosion. This may, for example, be particularly troublesome for metallic walls. In some embodiments, the various interior surfaces of the chambers may be lined and/or coated with a solid actinide free salt. In some embodiments, the solid salt may be similar to the molten salt but with a different salt mixture such as, for example, the salt wall may include the same constituents as the molten salt but with a different mole fraction. In some embodiments, the salt mixture selected for the salt wall may be chosen to have a higher melting point that the melting point of the molten salt. In some embodiments, the high temperatures of the molten salt may be problematic for standard chamber walls (e.g., metallic). A salt wall may protect the chamber wall from long term exposure to these high temperatures.

Figure 2:
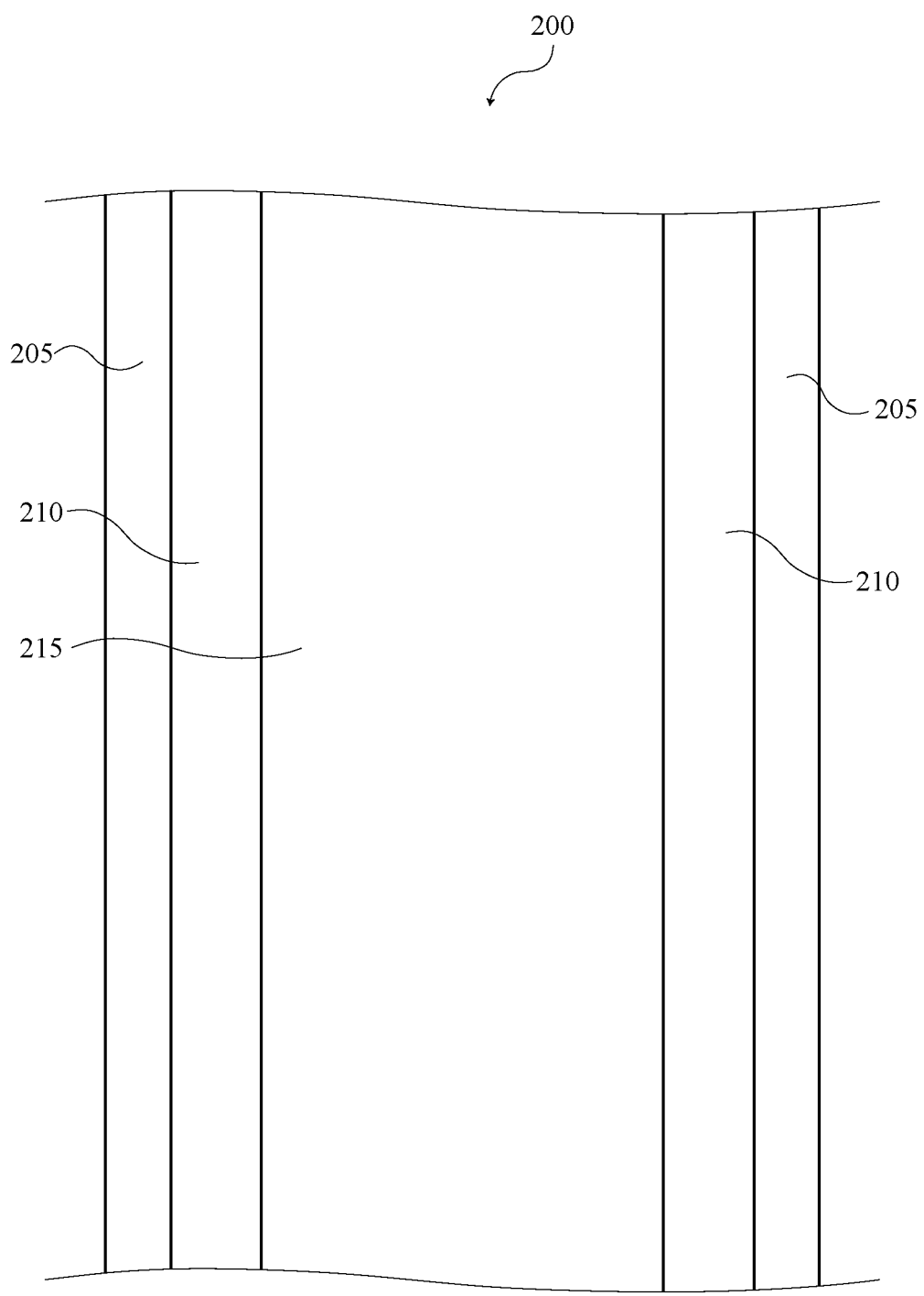
FIG. 2 illustrates a salt wall chamber.

FIG. 2 illustrates an example salt wall chamber 200. The salt wall chamber 200 may include a chamber wall 205 that is coated with a salt wall 210. The molten salt 215 may be disposed within the chamber. The molten salt 215 may include a mixture of salts that has the same constituents but different mole fractions as the salt mixture of the salt wall 210. The salt wall 210 may have a thickness that varies from 1 millimeter up to 3 inches. The thickness of the salt wall 210 may depend on the corrosiveness of the molten salt and/or a desired temperature gradient across the salt wall to, for example, protect the chamber wall.

Figure 3:
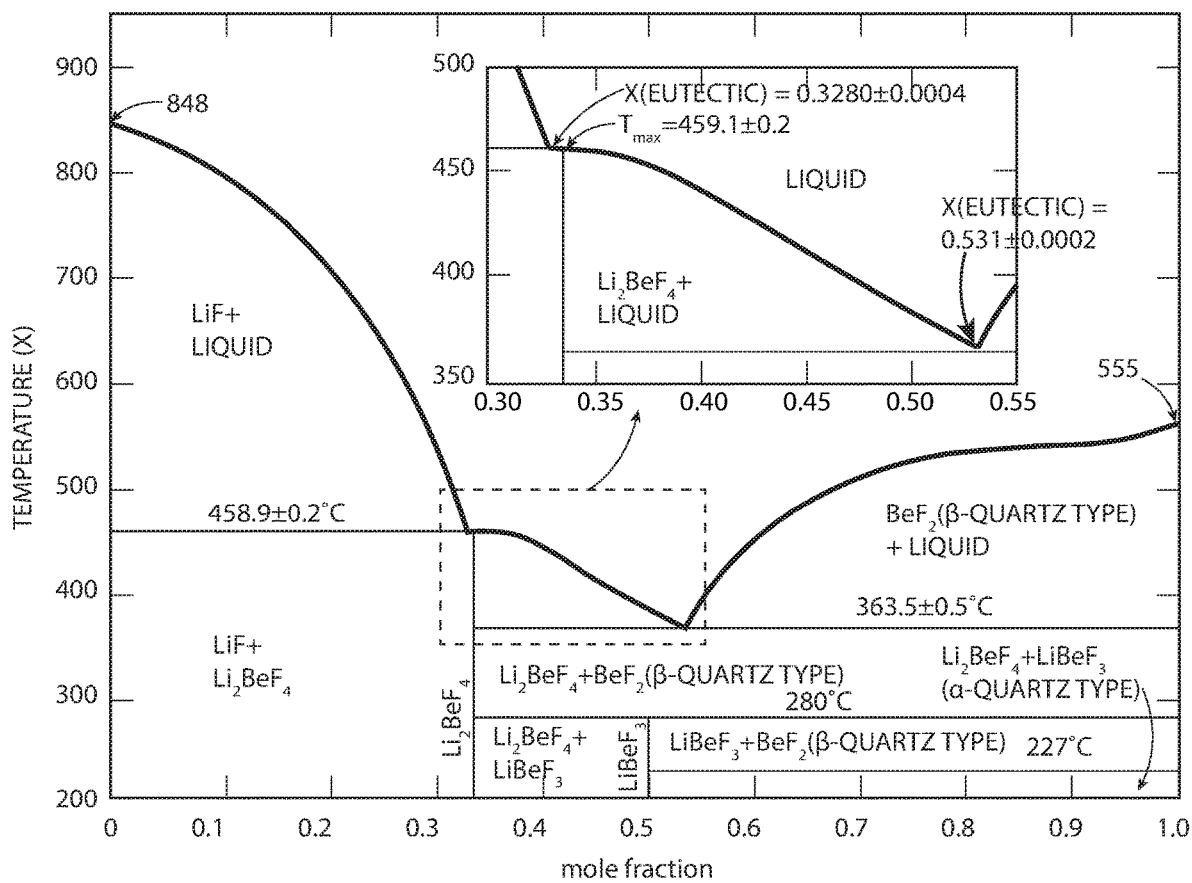
FIG. 3 is a phase diagram showing the melting point of a given salt that varies based on the mole fraction of various components of the salt mixture.

FIG. 3 is a phase diagram showing the melting point of given salts that varies based on the mole fraction of various components of the salt mixture. In this example, the salts are $LiF_2$ and $BeF_4$ and the phase diagram shows how the melting point varies based on the mole fraction of $BeF_4$. Similar phase diagrams can be found for most salt mixtures. As shown in the phase diagram, there are some mole fractions of the salt mixture that have a lower melting point than other mole fractions. Thus, the molten salt may have a mixture with a lower melting point than the melting point of the mixture comprising the salt wall.

In some embodiments, the salt wall may comprise a salt mixture with a melting point that is greater than about 50°, 75°, 100°, 125°, 150°, or 200° C. higher than the melting point of the salt mixture comprising the molten salt. In some embodiments, the melting point may be greater than about 500, 600, 700, or 800° C., etc. In some embodiments, both the salt wall and/or the molten salt may comprise salt mixture including uranium.

Figure 4:
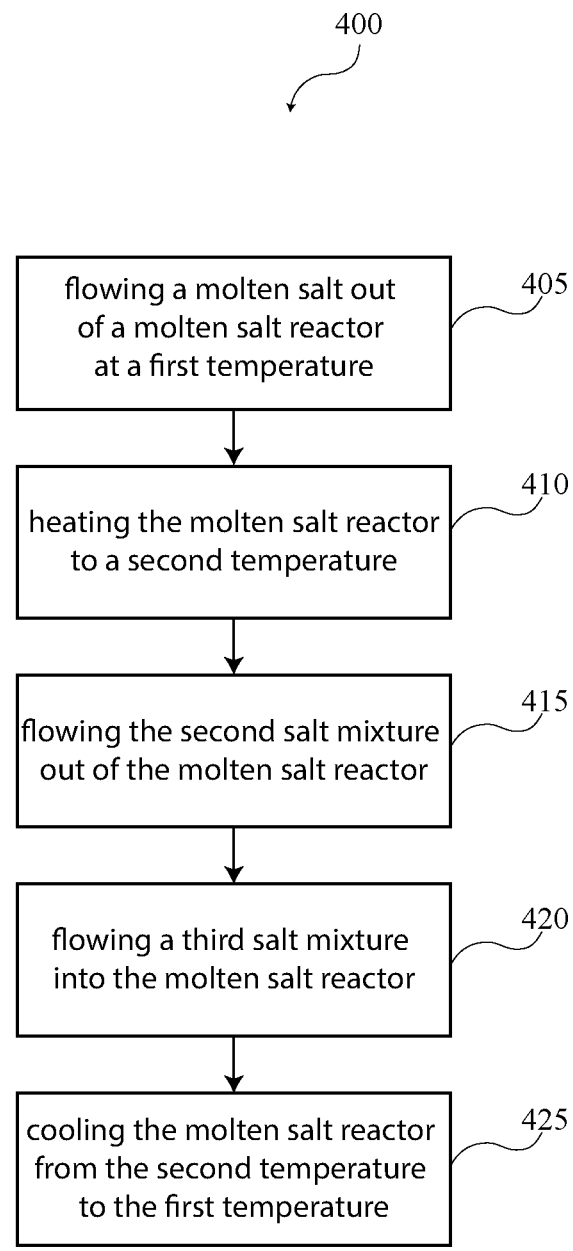
FIG. 4 is a flowchart representing a process for refreshing a salt wall in a molten salt reactor.

FIG. 4 is a flowchart representing a process 400 for refreshing a salt wall in a molten salt reactor. Any of the blocks in FIG. 4 may be removed, replaced, or reordered.

At block 405 the molten salt 215 may be flowed out of the molten salt reactor (or any chamber). The molten salt, for example, may be heated to a first temperature that is above the melting point of the molten salt but below the melting point of the salt wall 210. The molten salt 215 may be flowed out of the chamber to a storage location such as, for example, emergency dump tanks 165.

At block 410 the molten salt chamber may be heated to a temperature above the melting point of the salt wall. At this temperature, the salt will melt. As the salt wall 210 melts, the molten salt wall, at block 415 may flow out of the chamber to a storage location such as, for example, a second or different storage location. In some embodiments, the molten salt reactor may be scrubbed to ensure the housing and interior surfaces of the chamber are clean. Various agents, solvents, chemicals, etc. may be used to clean any of the salt wall from the interior surface of the chamber.

At block 420 a fresh actinide free salt mixture may be flowed through the chamber. The salt mixture may comprise the same mixture as the salt wall 210 that was previously melted and flowed out of the chamber. As the fresh actinide free salt mixture is flowed through the chamber, the molten salt chamber may be cooled. This cooling action may then allow the salt mixture to solidify on the interior surface of the chamber creating a salt wall of the desired thickness.

Once the salt wall has been adequately established within the chamber, the actinide bearing molten salt may be returned to the chamber to resume normal reactor operation.

In some embodiments, the process 400 may be repeated periodically. In some embodiments, the process 400 may occur when it is determined (e.g., using sensors) that corrosion has occurred or is about to occur within the molten salt chamber. For examples, various sensors may be disposed partially within the molten salt that may measure the presence of corrosive by products material within the molten salt. If the level of corrosive by products exceeds a predetermined threshold value, then process 400 may be initiated.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

The system or systems discussed herein are not limited to any particular hardware architecture or configuration.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
    flowing a molten salt out of a molten salt reactor at a first temperature, the molten salt comprising a first salt mixture comprising at least uranium, the first temperature being a temperature above the melting point of the first salt mixture, the molten salt reactor comprising a housing with a salt wall coating an interior surface of the housing, the salt wall comprising a second salt mixture, and the second salt mixture being solid at the first temperature;
    heating the molten salt reactor to a second temperature above the melting point of the second salt mixture causing the second salt mixture to melt;
    flowing the second salt mixture out of the molten salt reactor;
    flowing a third salt mixture into the molten salt reactor; and
    cooling the molten salt reactor from the second temperature to the third temperature causing the third salt mixture to solidify on the interior surface of the housing.

2. The method according to claim 1, wherein the third salt mixture and the second salt mixture comprise the same salt.

3. The method according to claim 1, wherein the third salt mixture comprises the same salts as the second salt mixture with a correct eutectic ratio.

4. The method according to claim 1, wherein the third salt mixture comprises the same salts as the second salt mixture with fewer impurities.

5. The method according to claim 1, further comprising cleaning the interior surface of the housing prior to flowing the third salt mixture into the molten salt reactor.

6. The method according to claim 1, further comprising flowing a molten salt into the molten salt reactor after cooling the molten salt reactor from the second temperature to the first temperature causing the third salt mixture to solidify on the interior surface of the housing.

7. The method according to claim 1, wherein the second salt mixture comprises an actinide and the third salt mixture does not include substantial amounts of actinides.

8. The method according to claim 1, wherein the second temperature is at least 50° C. greater than the first temperature.

9. The method according to claim 1, wherein cooling the molten salt reactor from the second temperature to the first temperature causing the third salt mixture to solidify on the interior surface of the housing continues until the third salt mixture has solidified to a thickness of about 1 centimeter on the interior surface of the housing.

10. The method according to claim 1, wherein one or more of the first salt mixture, the second salt mixture, or the third salt mixture comprises one or more salts selected from the group consisting of sodium fluoride, potassium fluoride, aluminum fluoride, zirconium fluoride, lithium fluoride, beryllium fluoride, rubidium fluoride, magnesium fluoride, and calcium fluoride.

11. The method according to claim 1, wherein one or more of the first salt mixture, the second salt mixture, or the third salt mixture comprises at least one salt selected from the group consisting of sodium chloride, magnesium chloride, and potassium chloride.

12. The method according to claim 1, wherein one or more of the first salt mixture, the second salt mixture, or the third salt mixture comprises a salt mixture comprising at least one salt selected from the group consisting of sodium fluoride, magnesium fluoride, and potassium fluoride.

13. A method comprising:
flowing a molten salt out of a molten salt reactor at a first temperature, the molten salt comprises a mixture including uranium and one or more salts selected from the group consisting of sodium fluoride, potassium fluoride, aluminum fluoride, zirconium fluoride, lithium fluoride, beryllium fluoride, rubidium fluoride, magnesium fluoride, and calcium fluoride;
heating the molten salt reactor to a second temperature above the melting point of a second salt mixture disposed as a salt wall on a surface of the molten salt reactor causing the second salt mixture to melt;
flowing the second salt mixture out of the molten salt reactor;
flowing a third salt mixture into the molten salt reactor; and
cooling the molten salt reactor from the second temperature to the third temperature causing the third salt mixture to solidify on the interior surface of the housing.

14. The method according to claim 13, wherein the salt wall comprises a second salt mixture that is solid at the first temperature.

15. The method according to claim 13, wherein the first temperature is a temperature above the melting point of the first salt mixture.

16. The method according to claim 13, wherein the third salt mixture does not include uranium.

17. The method according to claim 13, further comprising flowing a molten salt into the molten salt reactor after cooling the molten salt reactor from the second temperature to the first temperature causing the third salt mixture to solidify on the interior surface of the housing.

18. The method according to claim 13, wherein one or more of the first salt mixture, the second salt mixture, or the third salt mixture comprises one or more salts selected from the group consisting of sodium fluoride, potassium fluoride, aluminum fluoride, zirconium fluoride, lithium fluoride, beryllium fluoride, rubidium fluoride, magnesium fluoride, and calcium fluoride.

19. The method according to claim 13, wherein one or more of the first salt mixture, the second salt mixture, or the third salt mixture comprises at least one salt selected from the group consisting of sodium chloride, magnesium chloride, and potassium chloride.

20. The method according to claim 13, wherein one or more of the first salt mixture, the second salt mixture, or the third salt mixture comprises a salt mixture comprising at least one salt selected from the group consisting of sodium fluoride, magnesium fluoride, and potassium fluoride.

* * * * *